H. C. WIEDEMAN.
TAP CONNECTION FOR KEGS.
APPLICATION FILED APR. 1, 1912.
1,043,181.
Patented Nov. 5, 1912.
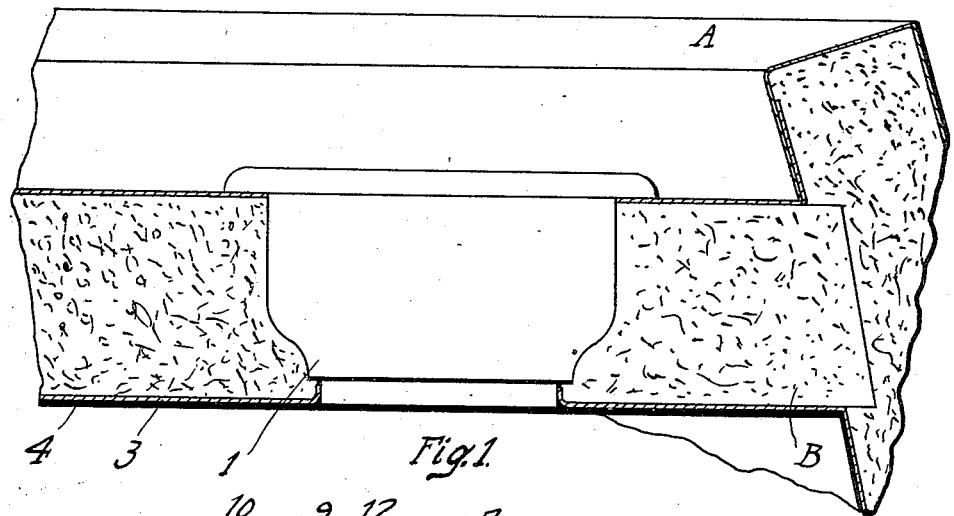
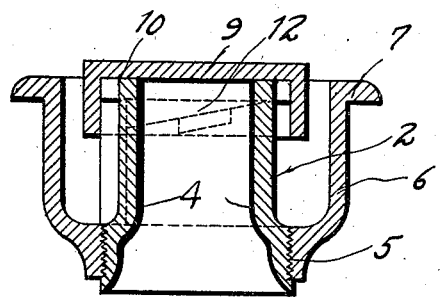
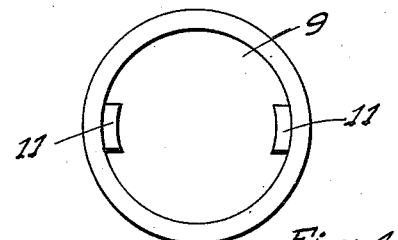
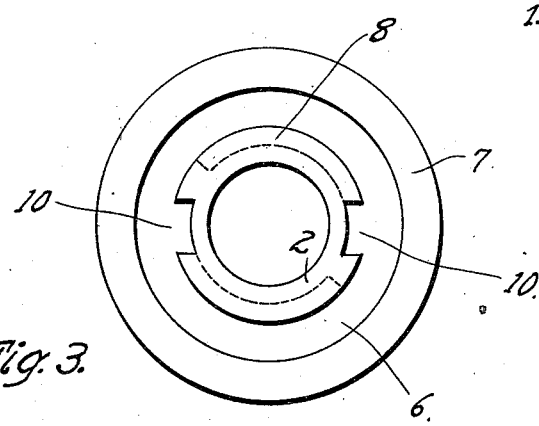
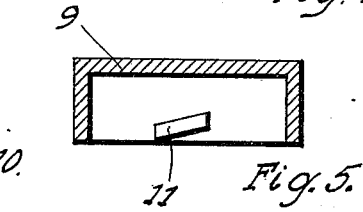
WITNESSES
Paul A. R. Kroesing, jr.
Lotta Lee Bray.
INVENTOR
Henry C. Wiedeman
BY
Ralgemond A. Parker
ATTORNEY
COLUMBIA PLANOGRAPH CO., WASHINGTON, D. C.

UNITED STATES PATENT OFFICE.

HENRY C. WIEDEMAN, OF DETROIT, MICHIGAN.

TAP CONNECTION FOR KEGS.

1,043,181.  Specification of Letters Patent.  Patented Nov. 5, 1912.

Application filed April 1, 1912. Serial No. 687,714.

*To all whom it may concern:*

Be it known that I, HENRY C. WIEDEMAN, citizen of the United States, residing at Detroit, county of Wayne, State of Michigan, have invented a certain new and useful Improvement in Tap Connections for Kegs, and declare the following to be a full, clear, and exact description of the same, such as will enable others skilled in the art to which it pertains to make and use the same, reference being had to the accompanying drawings, which form a part of this specification.

This invention relates to tap-connections for kegs, half barrels, whole barrels and other size packages and has for its object a tap-connection comprising a tap-bushing with screw threads on the outside thereof and a tap-ring or nut adapted to run on said threads and securely draw the head of the keg to the inner receptacle to which the tap-bushing is fastened by welding or brazing. This form of construction removes the threads from a place where they will be subject to moisture and where, also, the rusting might taint the contents of the inner receptacle. This also allows the inner surface of the bushing to be enameled, and does away with the danger of leakage which might be caused by threaded joints.

In the drawings:—Figure 1, is a section of a portion of the keg including its head, showing the tap-connection in position. Fig. 2, is a section of the tap-connection. Fig. 3, is a top elevation of the tap-connection, the cap being removed. Fig. 4, is an elevation of the inside of the cap. Fig. 5, is a section of the cap.

A, represents the side portion of a keg and B the head of the keg. The tap-hole 1 is bored in the head of the keg with an irregular bore to correspond with the shape of the tap ring or nut, so that the bore, through the head, is of smallest diameter on the inside of the keg and flares out a little below the center of the head, as shown in the drawings. The tap-bushing 2 is welded to the inner metallic receptacle 3 which is provided with a coat of enamel 4 reaching part way up into the inside of the tap bushing. The outside of the tap-bushing is threaded at the inner end as at 5 and on these threads runs the cup shaped tap-ring or nut 6 that is flanged at its outside end 7. This flange 7 is adapted to engage the outside of the head and when the tap-nut or ring is turned upon the bushing, it draws the head securely against the inner receptacle so as to fasten them firmly together. The outside end of the tap-bushing 2 is provided with a flange 8 which serves as a seat for the cap 9. The flange 8 is notched at either side at 10, so that the inward projecting lugs 11 of the cap may slide down under the flange and engage with the under side of the flange, which is inclined, as shown at 12 (dotted lines in Fig. 2). The lugs 11 are correspondingly beveled so that when the cap is given a portion of a turn, the lugs 11 on either side of the cap engage with the under inclined surfaces 12 of the flange portions on either side of the tap bushing so as to screw the cap securely to the tap-bushing and seal the cask.

The above construction allows the enameling of the tap bushing on the interior to any desired height so that this, as well as the inner receptacle, may be kept clean and free from rust. The threads are located on the outside of the tap-bushing so that they neither interfere with the contents of the inner receptacle nor are they subject to corrosion from the contents of the inner receptacle, while the nut serves to securely draw the head to the inner receptacle by taking advantage of the mechanical power of the screw.

What I claim is:—

1. The combination of a barrel provided with a head having an aperture and a metallic receptacle contained in the barrel, of a tap connection comprising a bushing attached to the inner metallic receptacle and projecting through the aperture in the head, the said bushing being externally threaded near its inner end and a cup-shaped nut spaced from the outer portion of the bushing to form a circumferential groove therewith and turned in toward the bushing at the inner end and screw-threaded at such inner end to engage the screw-threads of the bushing, the said nut having an annular flange adapted to engage the substance of the head to draw the same to the inner receptacle, substantially as described.

2. The combination with a barrel provided with a head having an aperture and a metallic inner receptacle contained in the barrel, of a tap connection comprising a bushing welded to the inner receptacle and externally screw-threaded near such welded connection, and a cup-shaped nut threaded at its inner end to engage the threads of the bushing and flaring out from the bushing to form a circumferential groove, the said nut being provided with a flange adapted to engage the substance of the barrel head and
5 a flanged cap adapted to fit over the bushing with its flange disposed in the circumferential groove, substantially as described.

In testimony whereof, I sign this specification in the presence of two witnesses.

HENRY C. WIEDEMAN.

Witnesses:
  STUART C. BARNES,
  VIRGINIA C. SPRATT.

Copies of this patent may be obtained for five cents each, by addressing the "Commissioner of Patents, Washington, D. C."